(12) United States Patent
Rothe et al.

(10) Patent No.: US 6,578,898 B2
(45) Date of Patent: Jun. 17, 2003

(54) CONVERTIBLE VEHICLE

(75) Inventors: Karl Rothe, Rieste (DE); Werner Schnieder, Georgsmarienhuette (DE); Udo Heselhaus, Ibbenbueren (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/879,493

(22) Filed: Jun. 12, 2001

(65) Prior Publication Data

US 2002/0030380 A1 Mar. 14, 2002

(30) Foreign Application Priority Data

Jun. 15, 2000 (DE) .......................................... 100 29 478
Jun. 15, 2000 (DE) .......................................... 100 29 471

(51) Int. Cl.[7] ................................................. B60J 7/12
(52) U.S. Cl. ................................................. 296/107.07
(58) Field of Search .................. 296/146.14, 107.07, 296/107.08, 107.09, 107.11, 107.15, 107.01

(56) References Cited

U.S. PATENT DOCUMENTS

| | | | | | |
|---|---|---|---|---|---|
| 2,833,593 A | * | 5/1958 | Olivier et al. | ......... | 296/107.07 |
| 2,836,457 A | * | 5/1958 | Beerman et al. | ....... | 296/107.07 |
| 3,332,163 A | * | 7/1967 | Lohr et al. | ................. | 43/44.86 |
| 3,333,362 A | * | 8/1967 | Kostin et al. | .......... | 296/146.14 |
| 3,346,297 A | * | 10/1967 | Colautti et al. | ........ | 296/146.14 |
| 4,784,428 A | * | 11/1988 | Moy et al. | ............. | 296/107.07 |
| 6,454,342 B2 | * | 9/2002 | Heselhaus et al. | ..... | 296/107.07 |
| 2002/0005653 A1 | * | 1/2002 | Heselhause et al. | ... | 296/107.07 |
| 2002/0024230 A1 | * | 2/2002 | Pfertner et al. | ........ | 296/107.07 |
| 2002/0030380 A1 | * | 3/2002 | Rothe et al. | ........... | 296/107.07 |
| 2002/0074822 A1 | * | 6/2002 | Rothe et al. | ........... | 296/107.07 |

* cited by examiner

Primary Examiner—D. Glenn Dayoan
Assistant Examiner—Jason Morrow
(74) Attorney, Agent, or Firm—Jordan and Hamburg LLP

(57) ABSTRACT

A convertible vehicle including a folding top frame constructed in mirror-image fashion to a longitudinal median plane of the vehicle and having a rear folding top clamping collar. The folding top clamping collar can be shifted jointly with a folding top about a main bearing fastened to the car body and stowed in a rear folding top compartment. The flexible roof skin has, in the rear region, a rear window which extends above the folding top clamping collar and can be detached in the region of the lower transverse side edge from the folding top clamping collar. The rear window is supported in the closed position with its lower transverse side edge directly above and on the folding top clamping collar. A control assembly is linked to the frame encompassing the rear window in U-shaped fashion such that the frame with the rear window can be lifted from the folding top clamping collar during a movement of the folding top and shifted to a distance and an angle relative to the folding top clamping collar.

42 Claims, 21 Drawing Sheets

ID: 6,578,898 B2

CONVERTIBLE VEHICLE

BACKGROUND OF THE INVENTION

Figure 1:
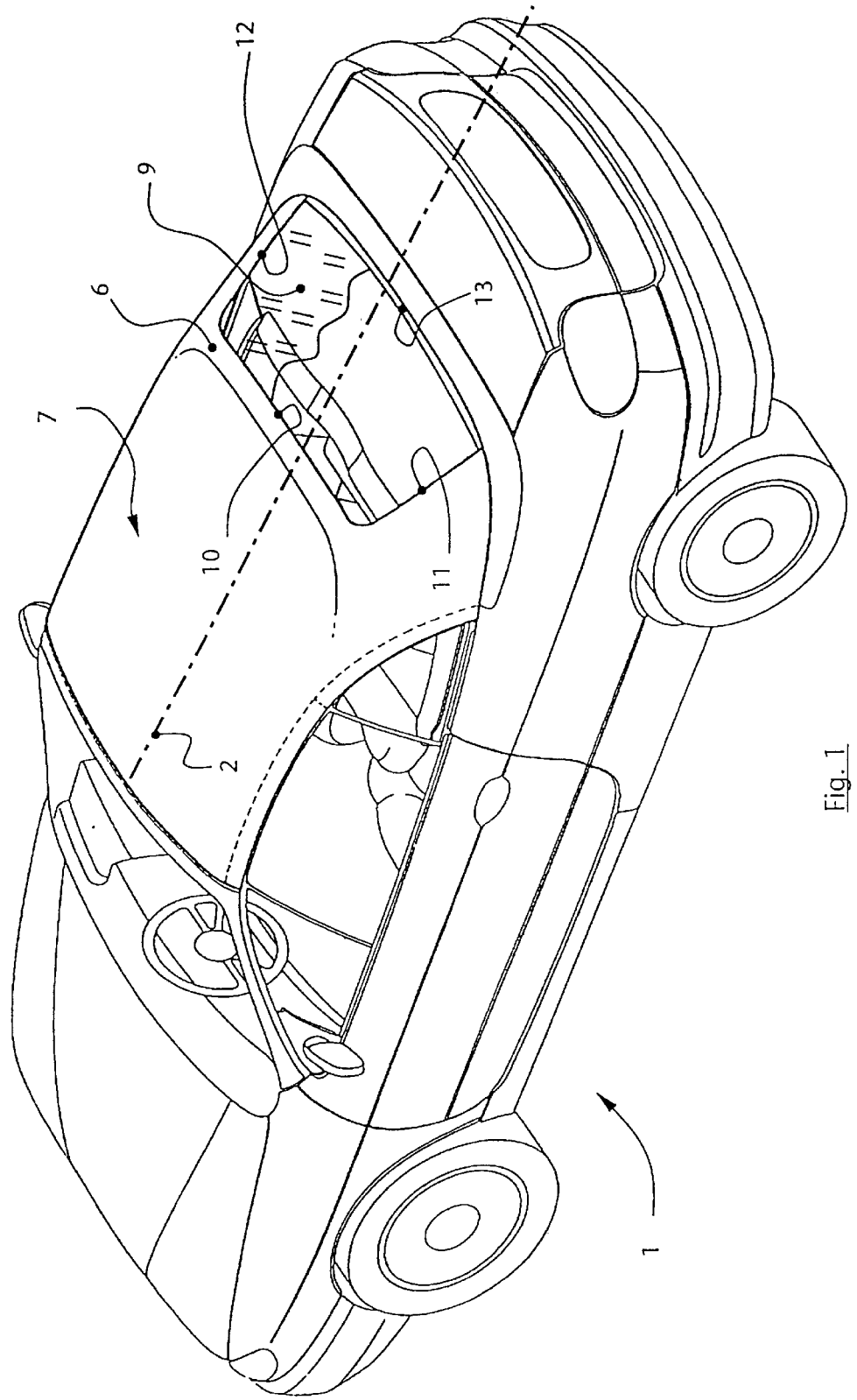

The invention relates to a convertible vehicle with a folding top having a rear folding top clamping collar.

In a convertible vehicle of this type described in German Patent Publication No. DE 41 28 115 C1, the folding top has a flexible roof skin which borders the rear window and extends also in the region above the rear folding top clamping collar with a wide strip of fabric towards the rear window. In view of the decreased dimensions of the rear window associated therewith, the visibility for a vehicle user is limited disadvantageously, especially when reversing.

In a folding top described in German Patent Publication No. DE 43 09 607 A1, an adjustable rear window is provided, the lower edge region of which, in the closed position, lies against the folding top clamping collar from the inside forming an external sealing joint. Only a little space is available for moving the components into the open position while the control system is expensive.

SUMMARY OF THE INVENTION

The invention is concerned with the problem of providing a convertible vehicle, the rear window of which, integrated adequately tightly into the roof skin with few components, provides improved visibility through the rear window and can be shifted into the open and closed positions with simple control means while avoiding roof skin stresses and assumes a space-saving stowed position in the rear region of the vehicle.

The convertible vehicle constructed pursuant to the invention is provided with a rear window which has a three-sided frame and the free lower transverse side edge of which can be placed directly from above onto the folding top clamping collar so that an enlargement of the rear window surface is achieved in this region. In this manner, the improved rear vision in the rear region of the vehicle improves the driving safety and the supported edge region of the rear window improves the sealing effect, while showing little susceptibility to becoming contaminated.

The structural component consisting of the frame and the rear window is integrated in the roof skin such that due to a control assembly, engaging the edge of the frame, this structural unit is guided optimally on a movement curve during the opening and closing movement of the folding top frame and overloading of the flexible roof skin is avoided in the rear region.

In a first movement phase in which the convertible vehicle is opened, the rear structural assembly is swivelled up in the driving direction. During this phase of the movement, the lower transverse side edge of the rear window is detached from its connecting engagement with the folding top clamping collar which, together with the rear window assembly, arrives in an upwardly directed position and a distance between the rear window and folding top clamping collar is formed by the control assembly. A folding top compartment lid can now be opened and the opening movement of the folding top frame can be continued. Moreover, the rear window assembly with the folding top clamping collar is shifted downward counter to the driving direction. At the same time, the lower transverse side edge of the rear window is moved back out of its spaced-apart position into the vicinity of the folding top clamping collar and as such, a path is traversed on which the folding top can be put away downward in a narrow region of the car body without being impeded even in the region of the rear folding top box.

For controlling the above-described rear window movement, the control assembly has a hinged strut and a unit guiding the pushing with which the relative movement between the folding top clamping collar and the rear window is possible such that the rear window necessarily passes through an optimum movement curve and an adaptation to the space relationships in the rear region of different vehicles is possible.

In the last phase of the stowing movement, during the opening of the folding top, the rear window is shifted by means of the control assembly relative to the folding top clamping collar such that the lower transverse side edge protrudes outward over the stowed folding top clamping collar and a space-saving stowed position in the folding top compartment is achieved for the enlarged rear window and for the control assembly.

Reference is made to the description below and to the drawing with regard to further significant details and advantageous embodiments of the invention. In these, an example of the convertible vehicle with the inventive rear window connection is explained in greater detail.

IN THE DRAWINGS

Figure 2:
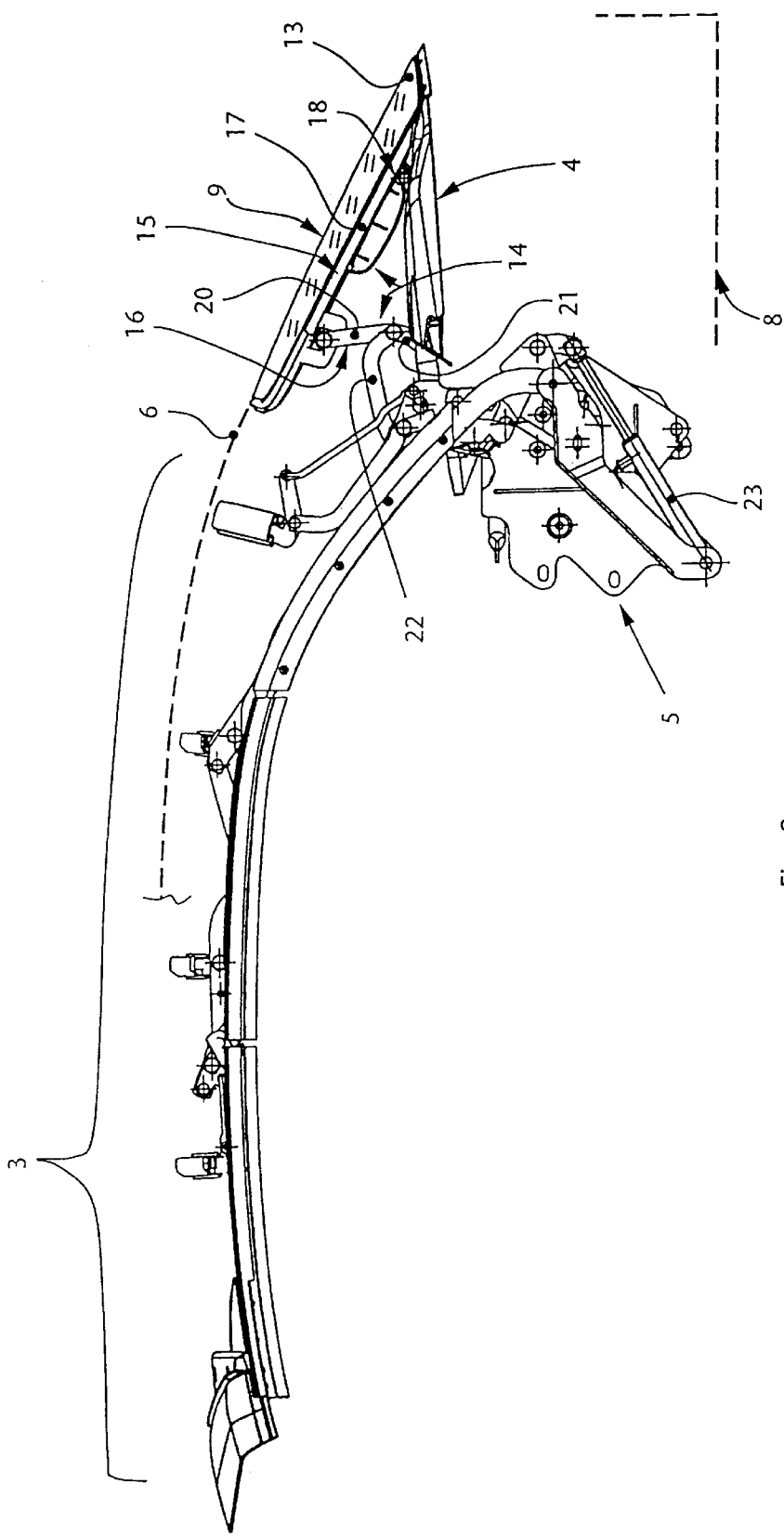
Figure 3:
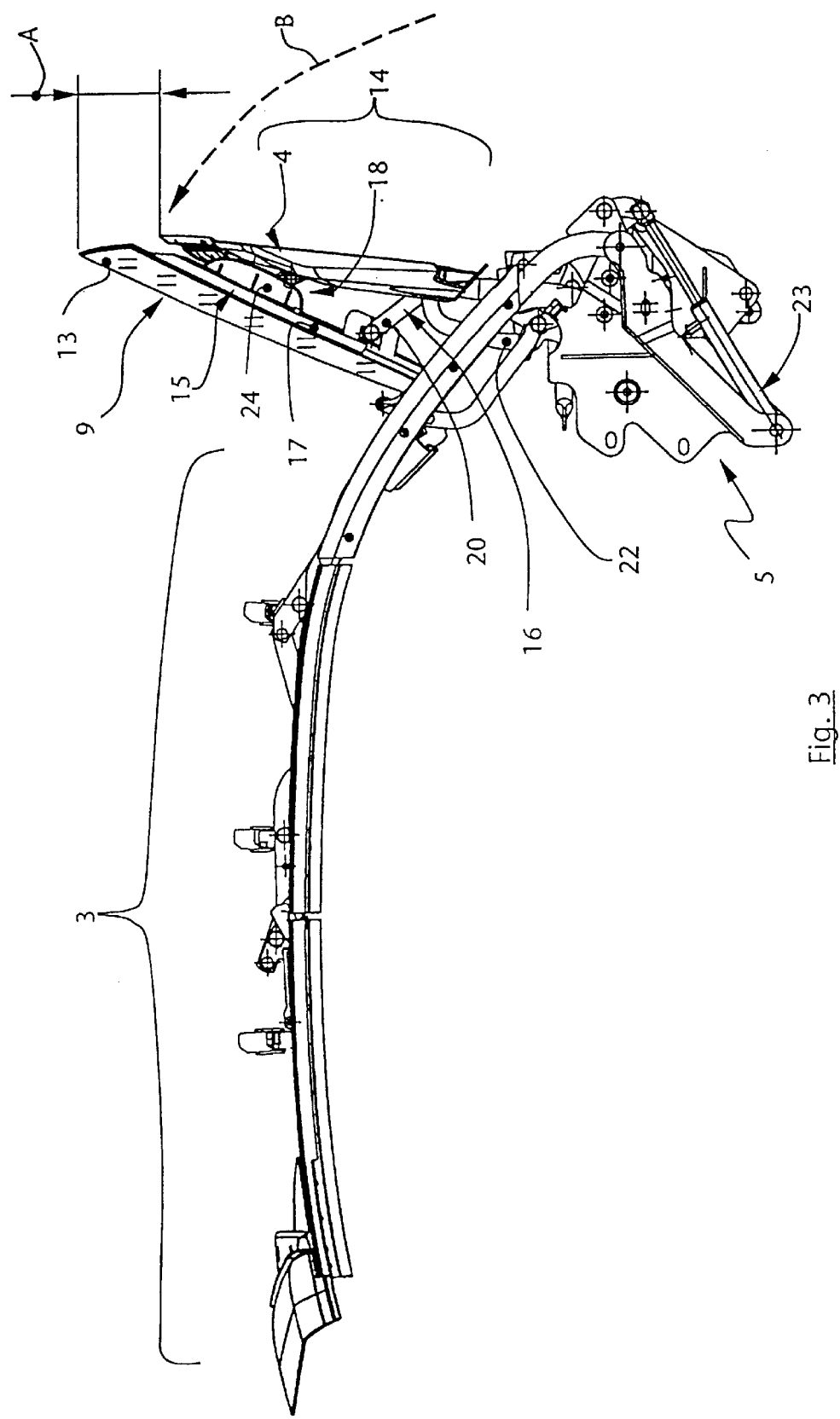
Figure 4:
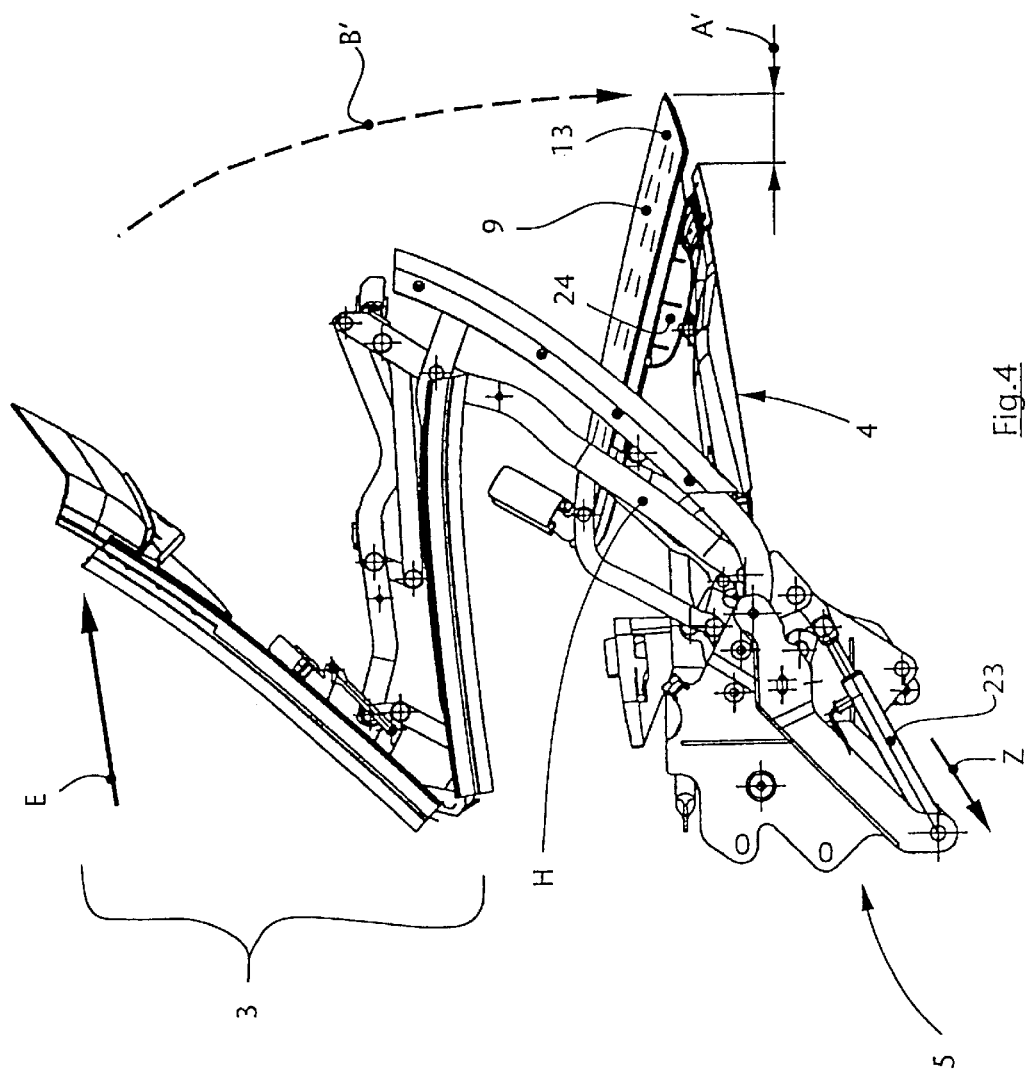
Figure 5:
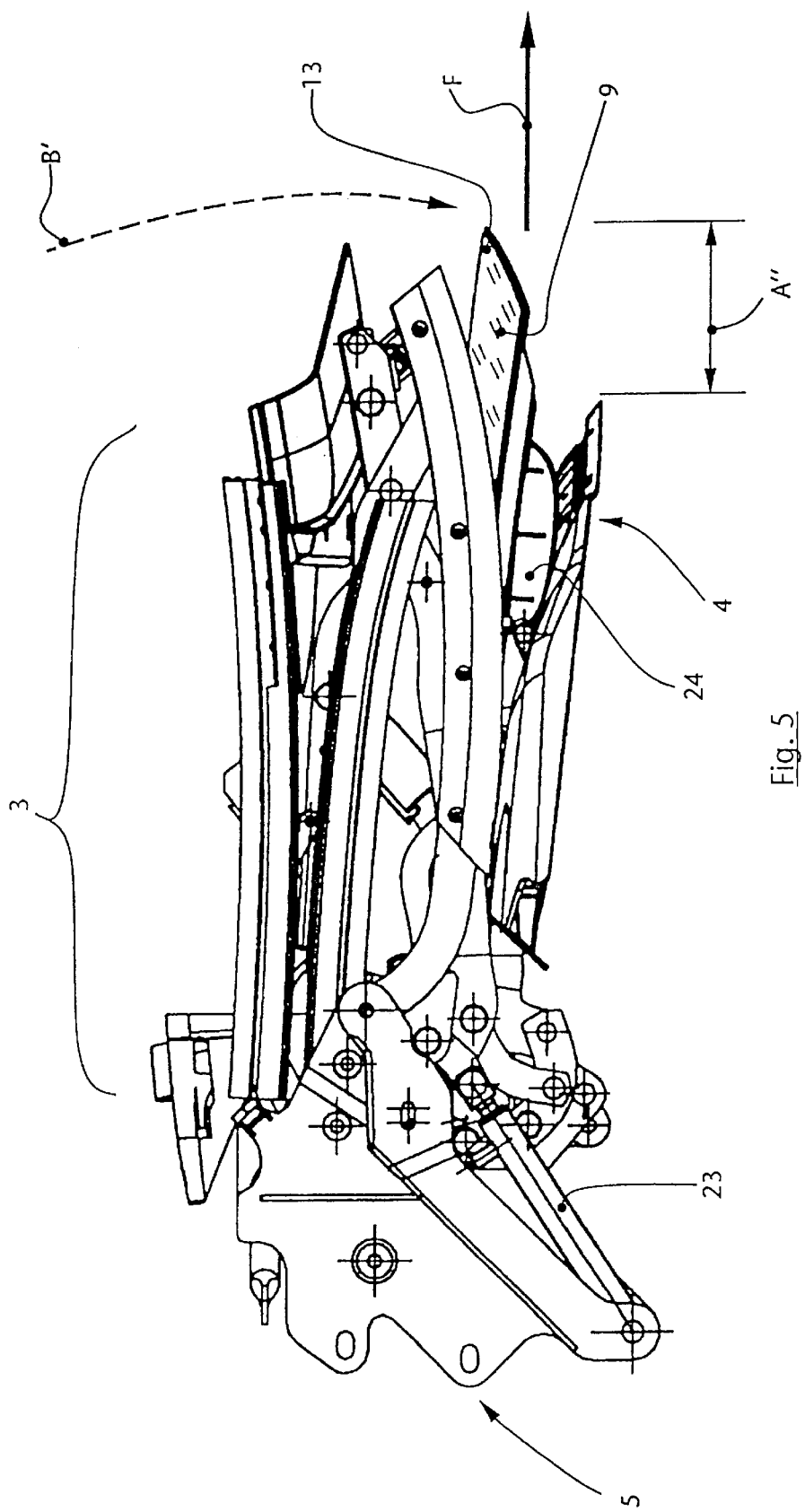
Figure 6:
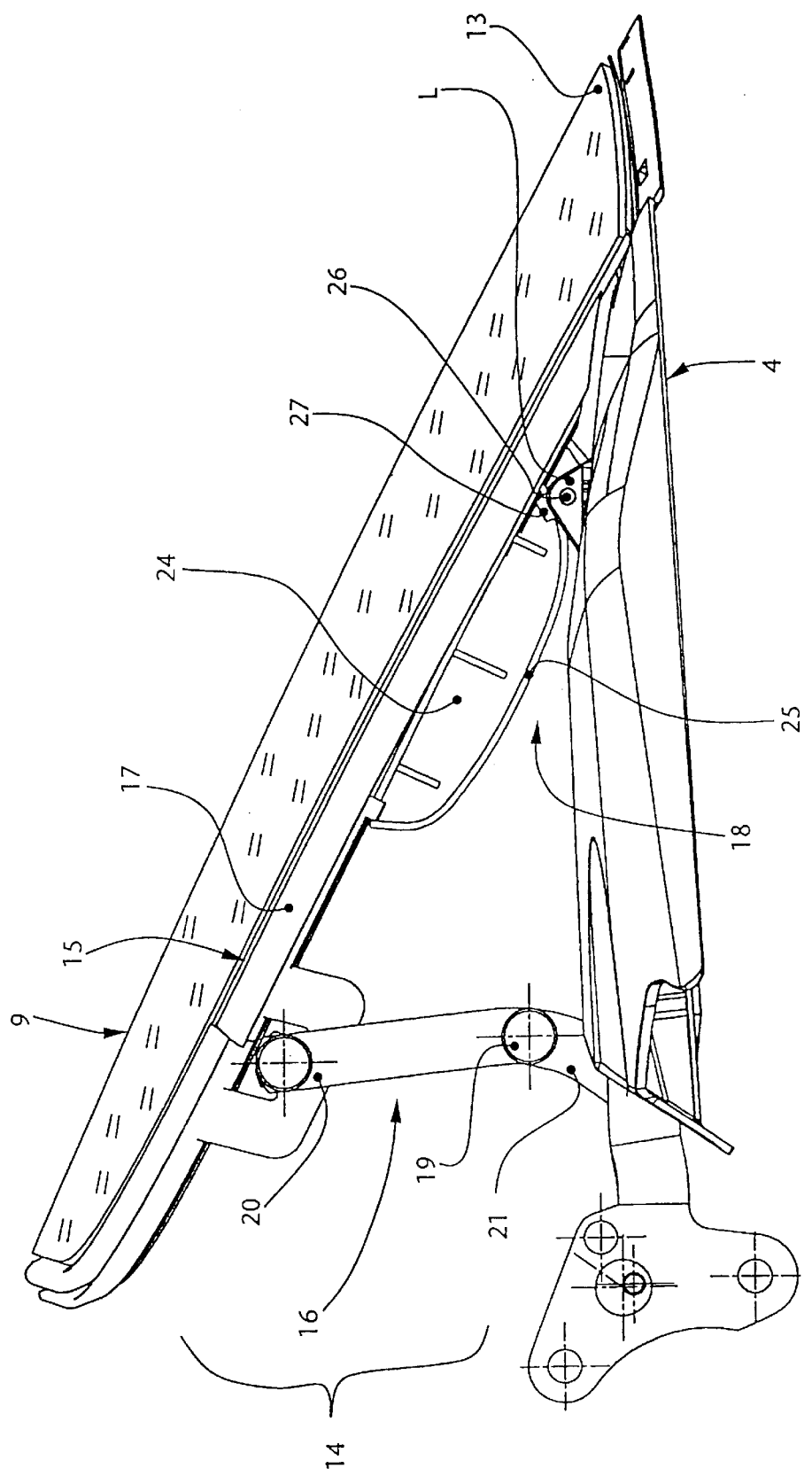

FIG. 1 shows a perspective rear view of a convertible vehicle with a folding top, which has a rear window, in the closed position, FIG. 2 shows a side view of the inventive folding top frame in the closed position of FIG. 1, FIGS. 3–5 show representations of different movement phases during the shifting of the folding top frame of FIG. 2 into the open position, FIG. 6 shows an enlarged representation of a detail of the rear window, lying in the closed position on the folding top clamping collar.

Figure 7:
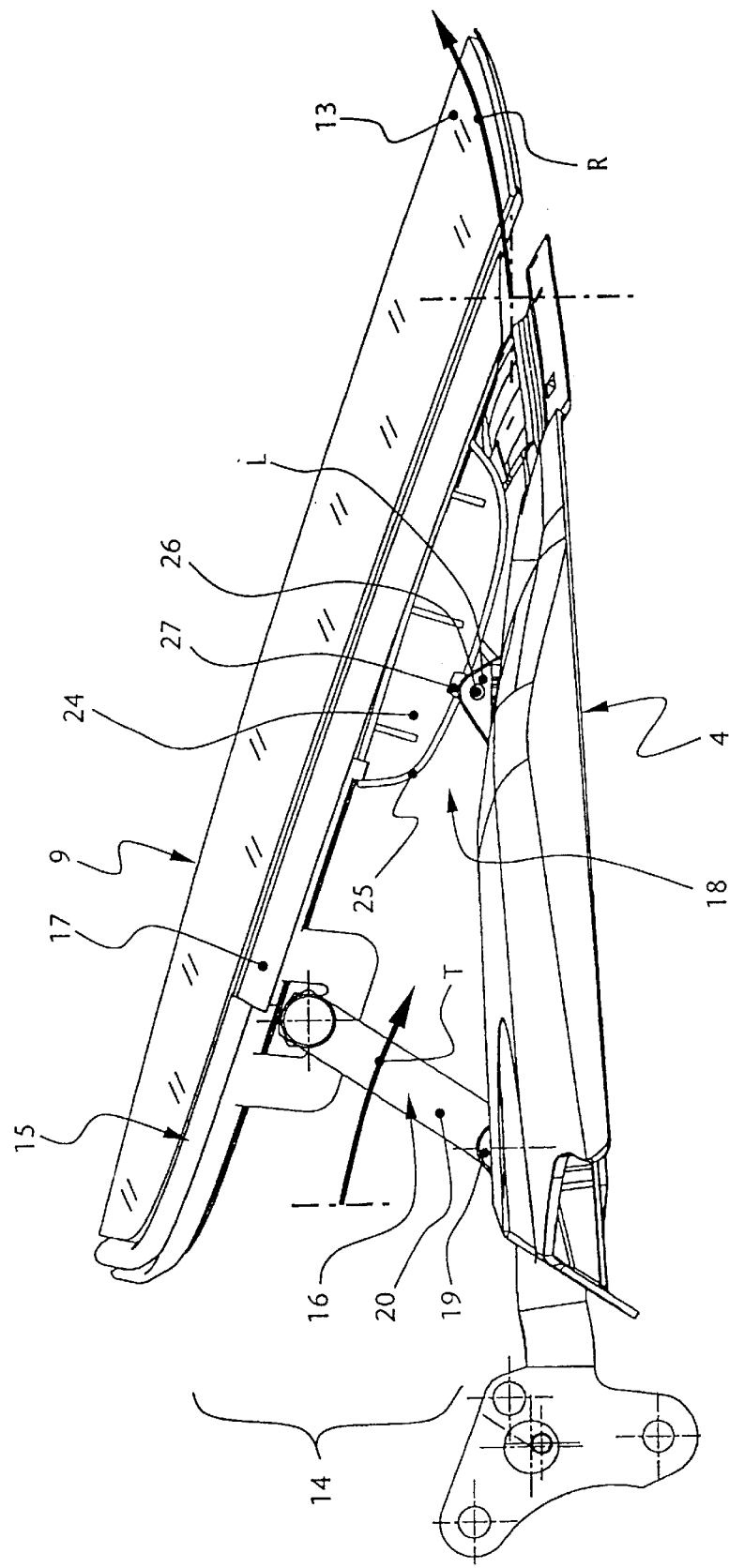
Figure 8:
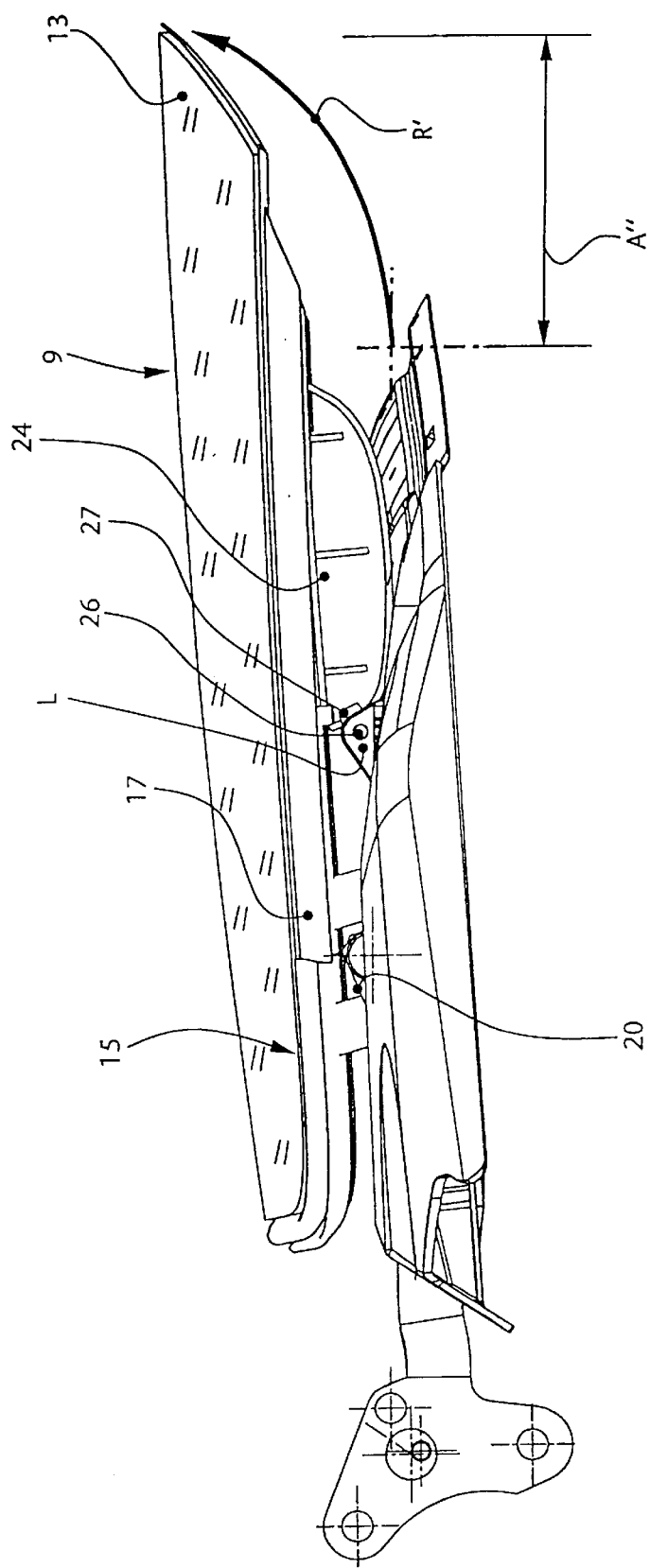
Figure 9:
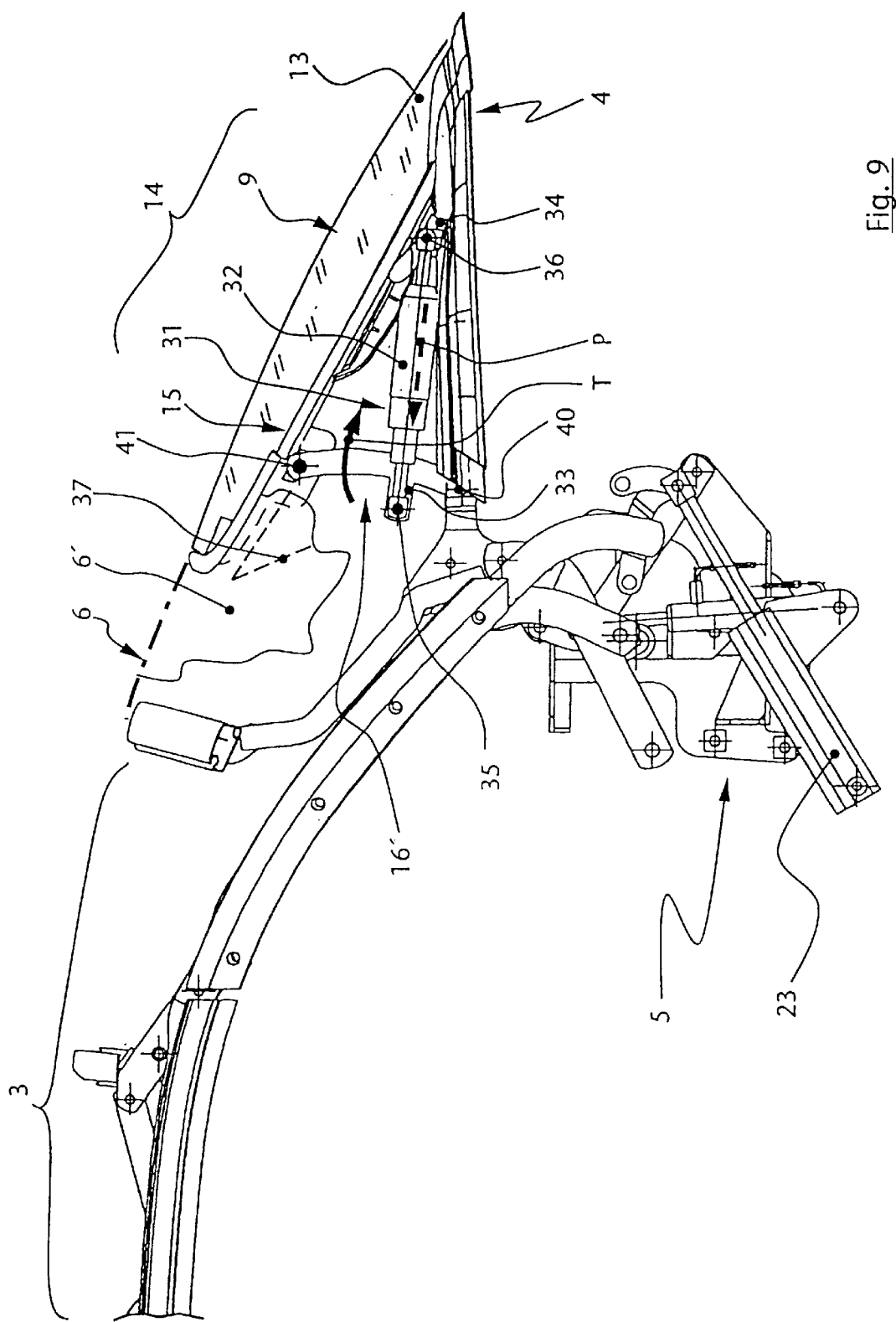
Figure 10:
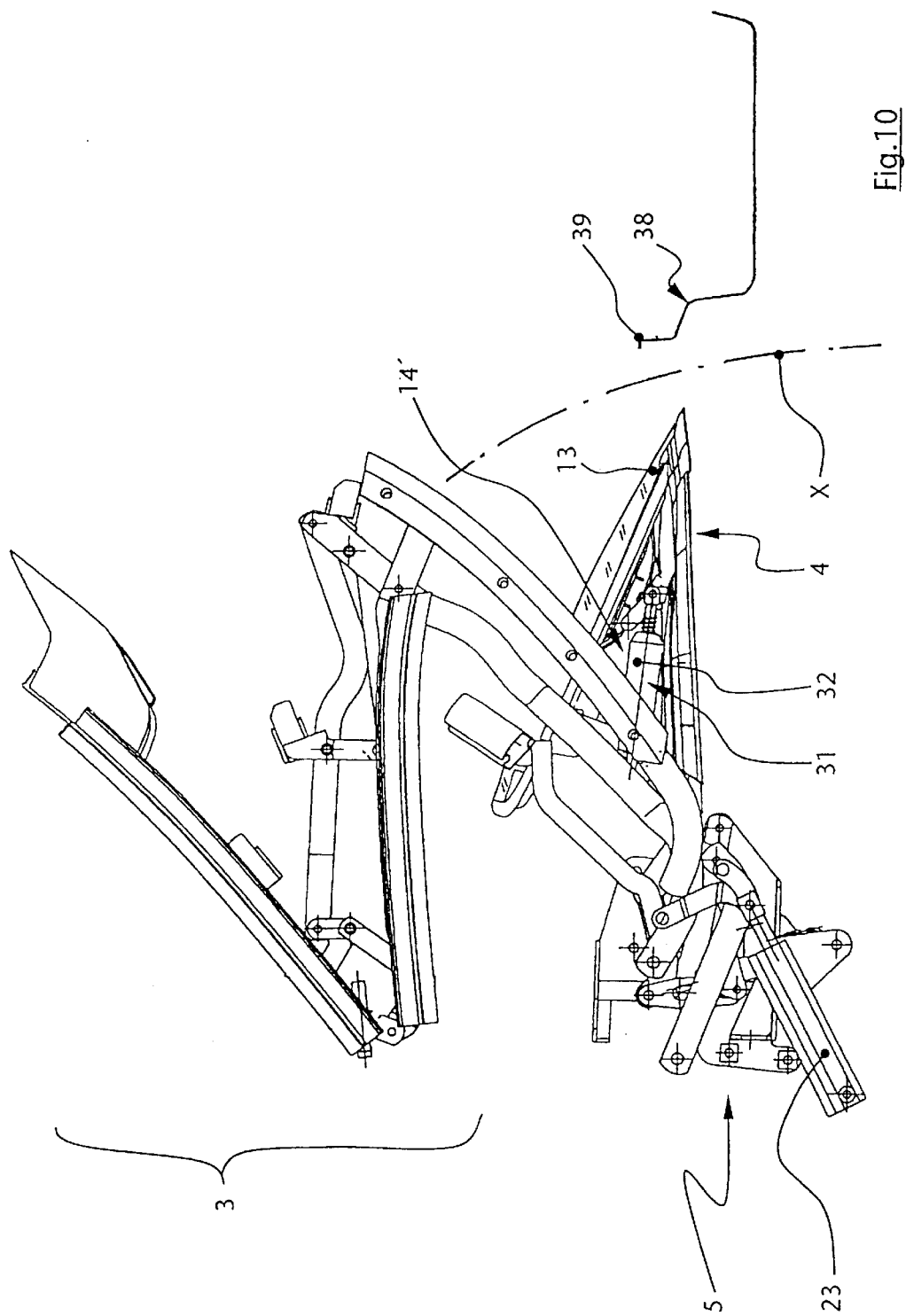
Figure 11:
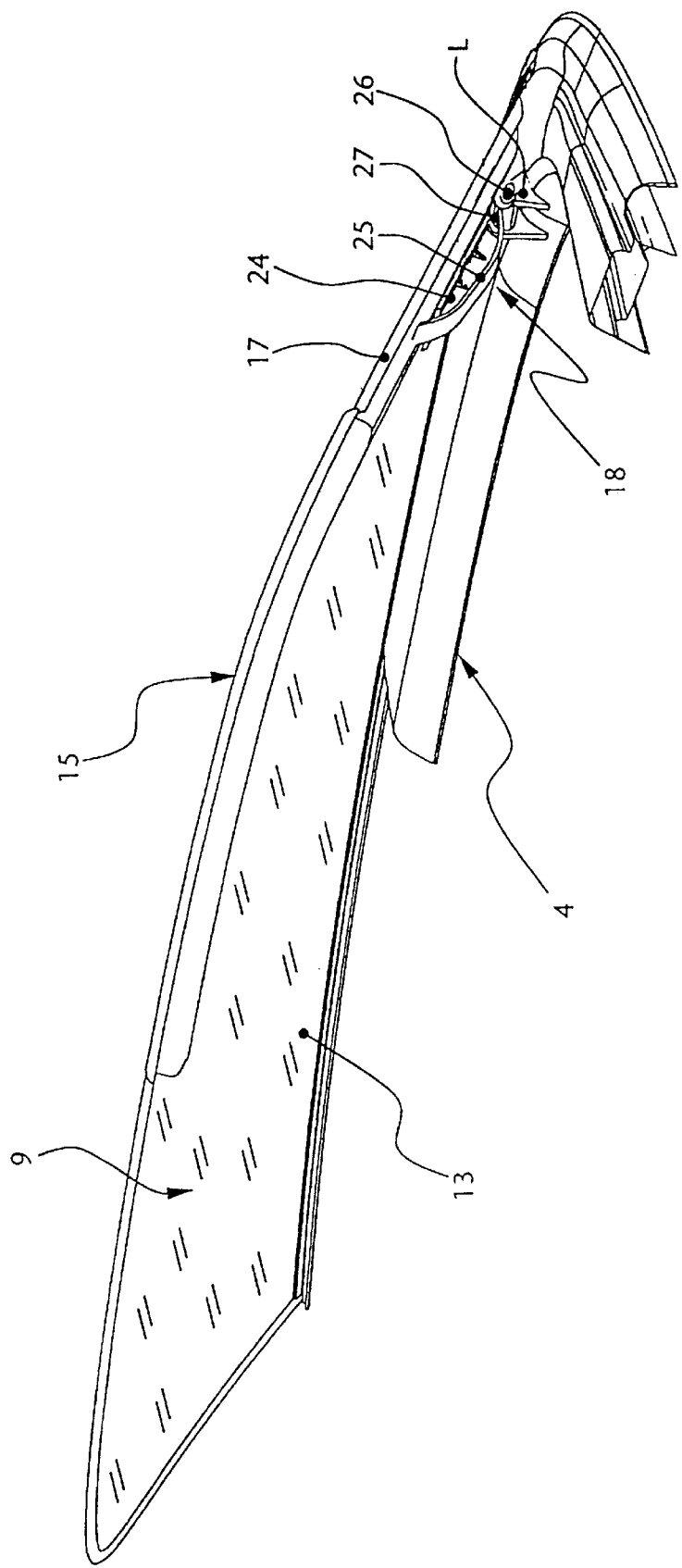
Figure 12:
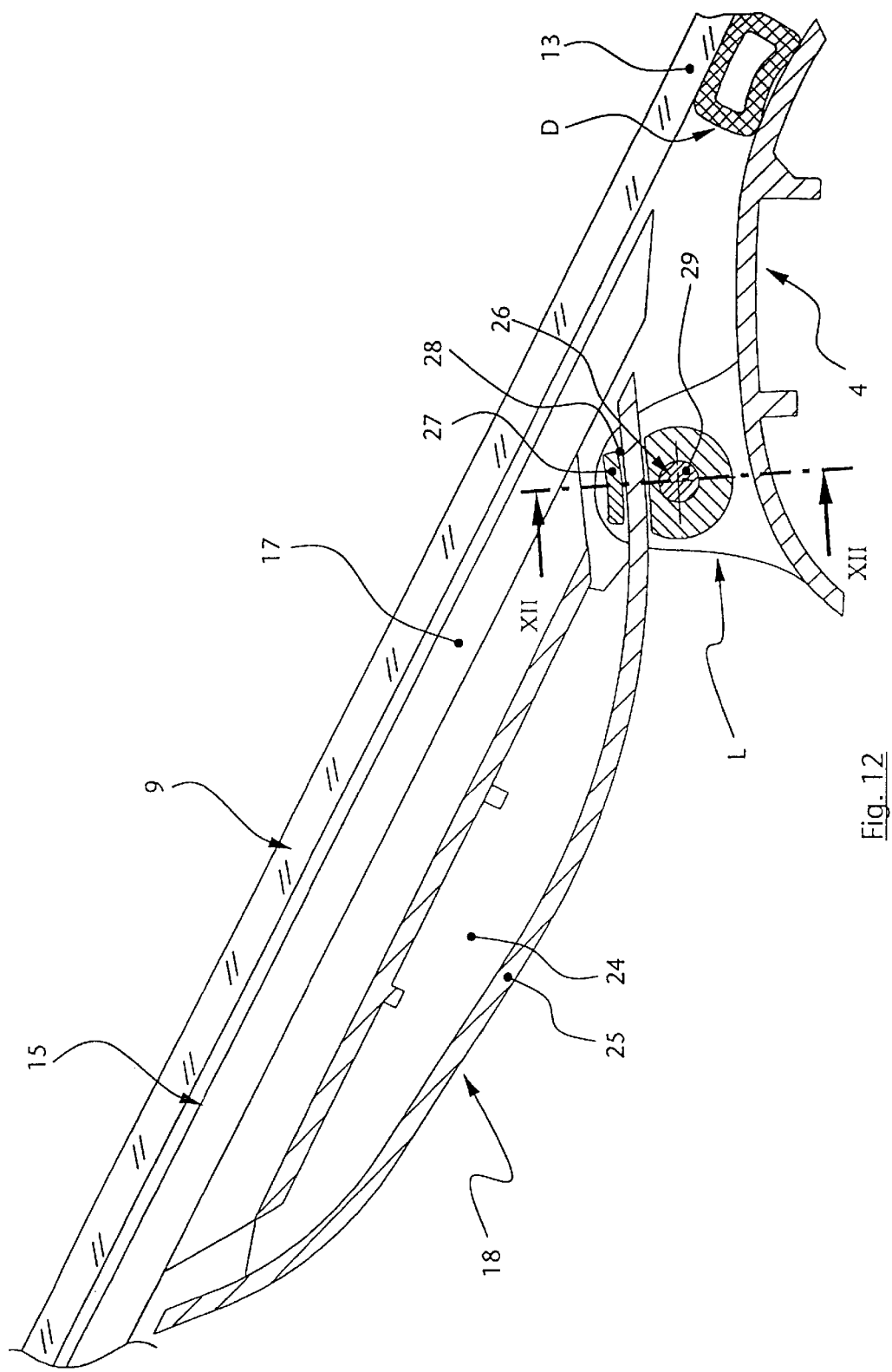
Figure 13:
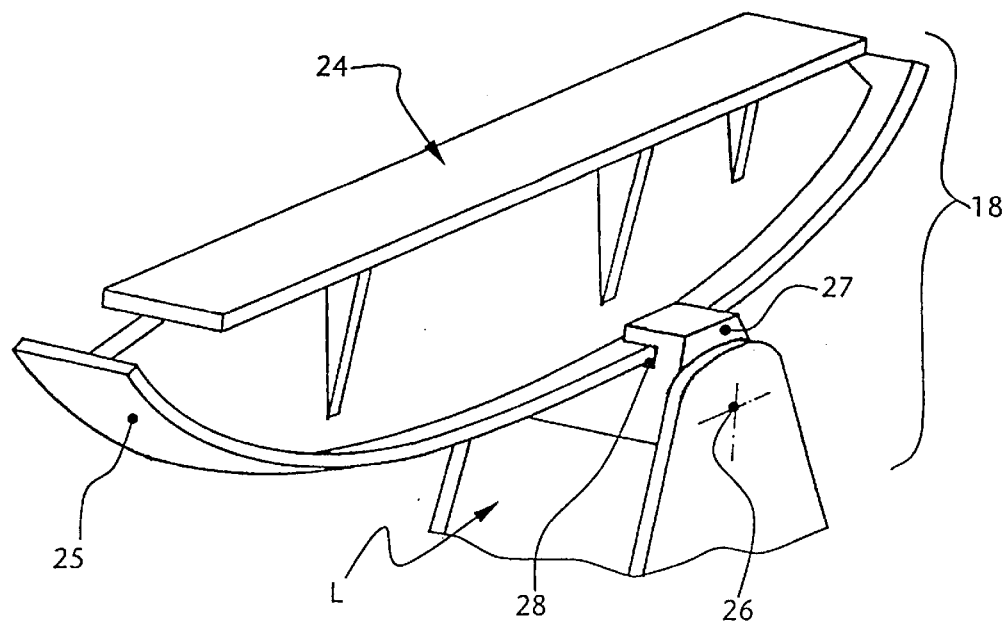
Figure 14:
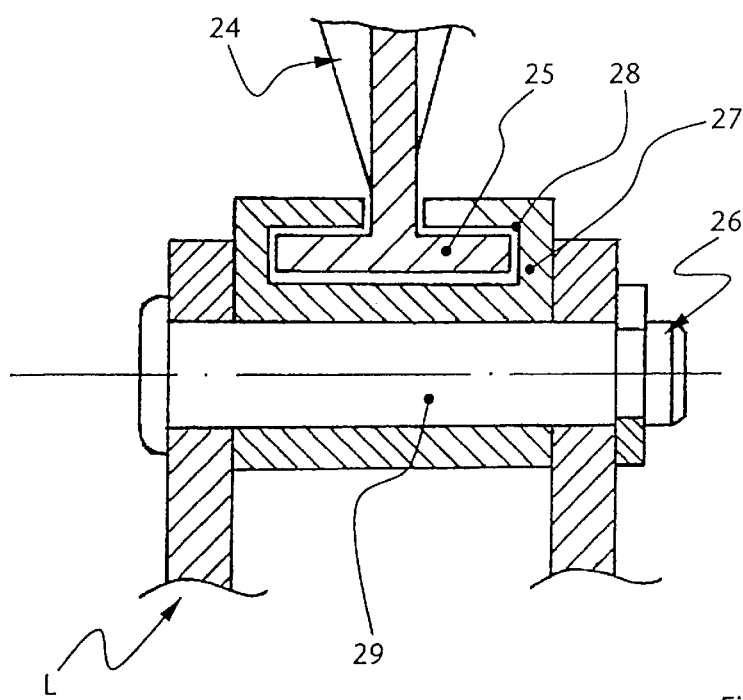
Figure 15:
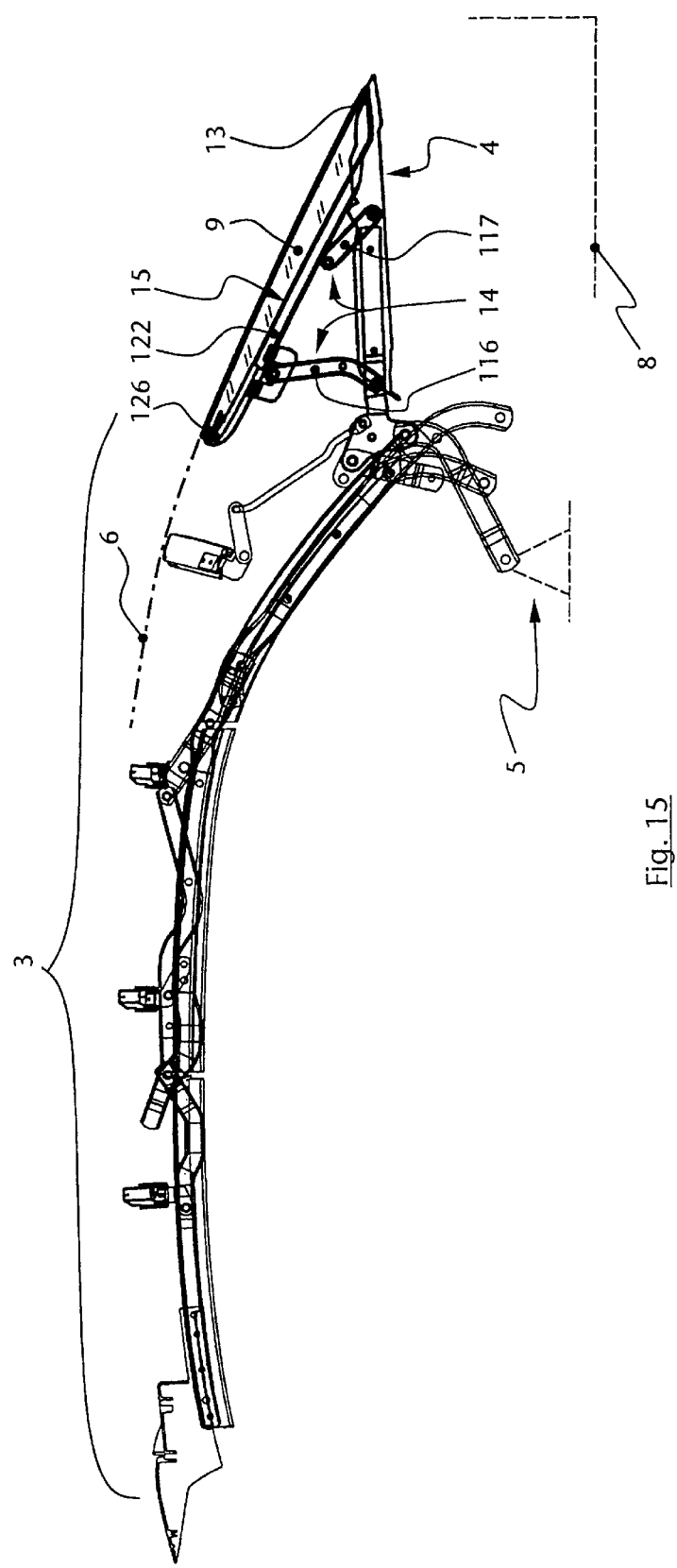
Figure 19:
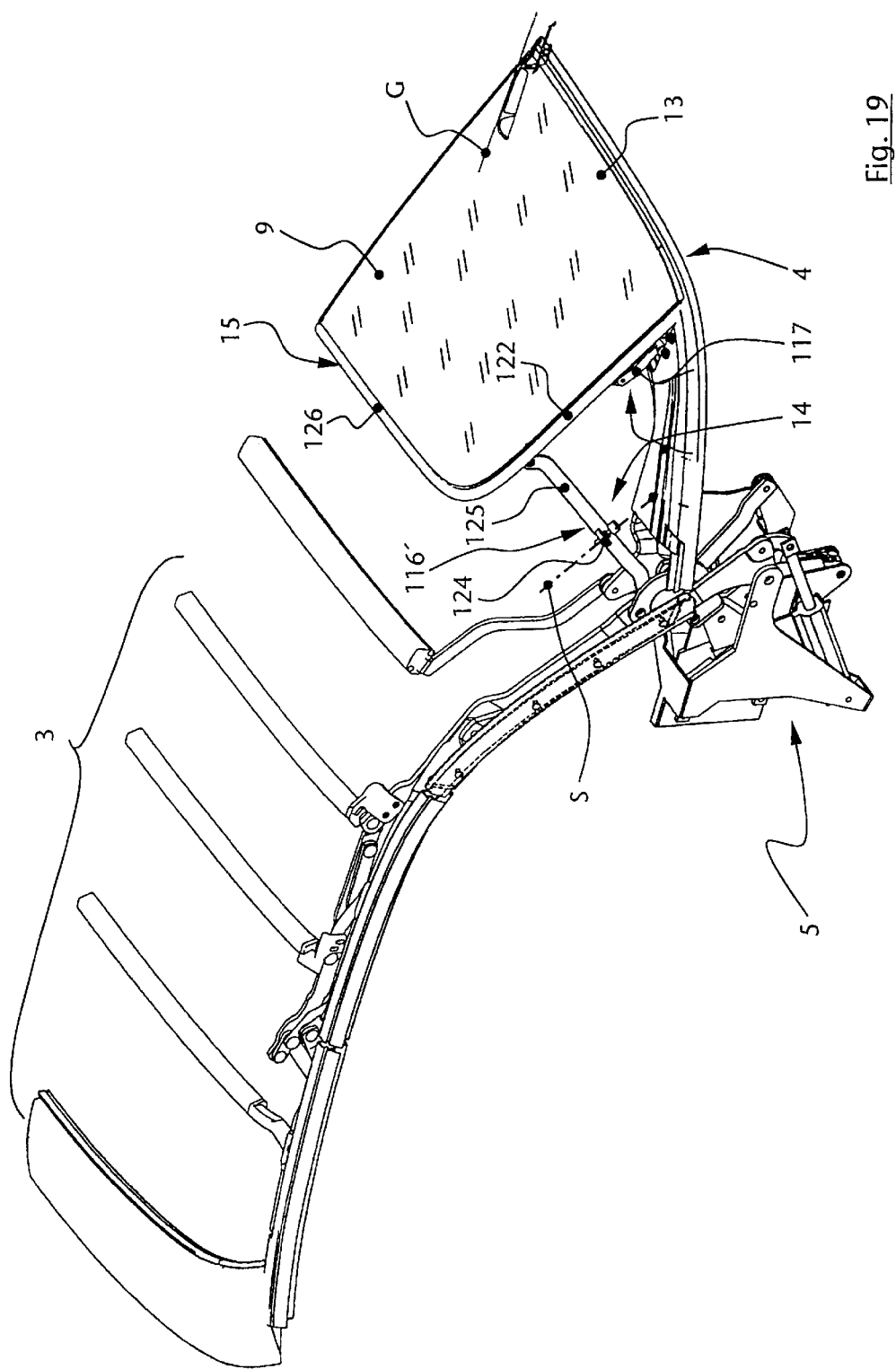
Figure 20:
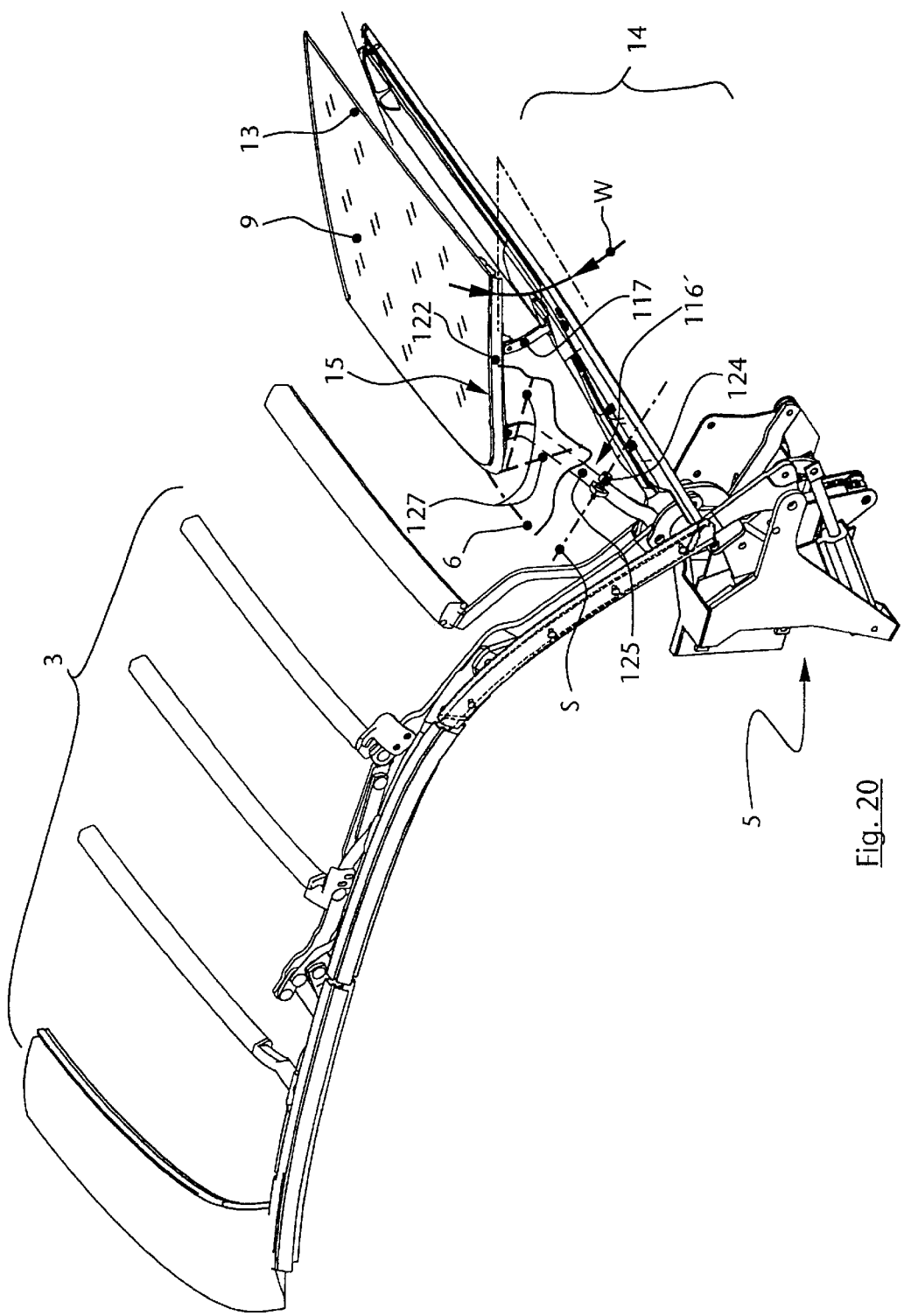
Figure 21:
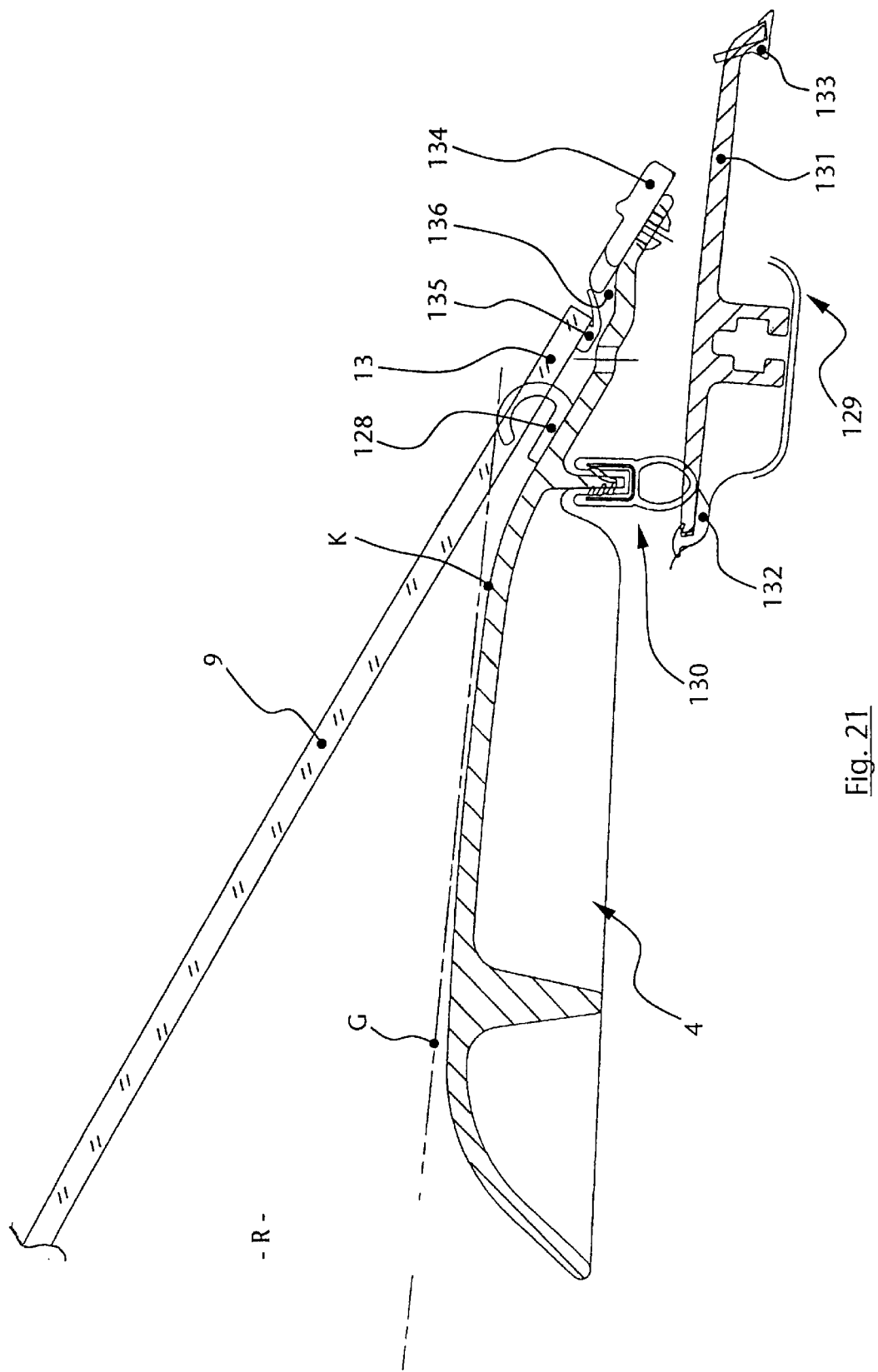
Figure 22:
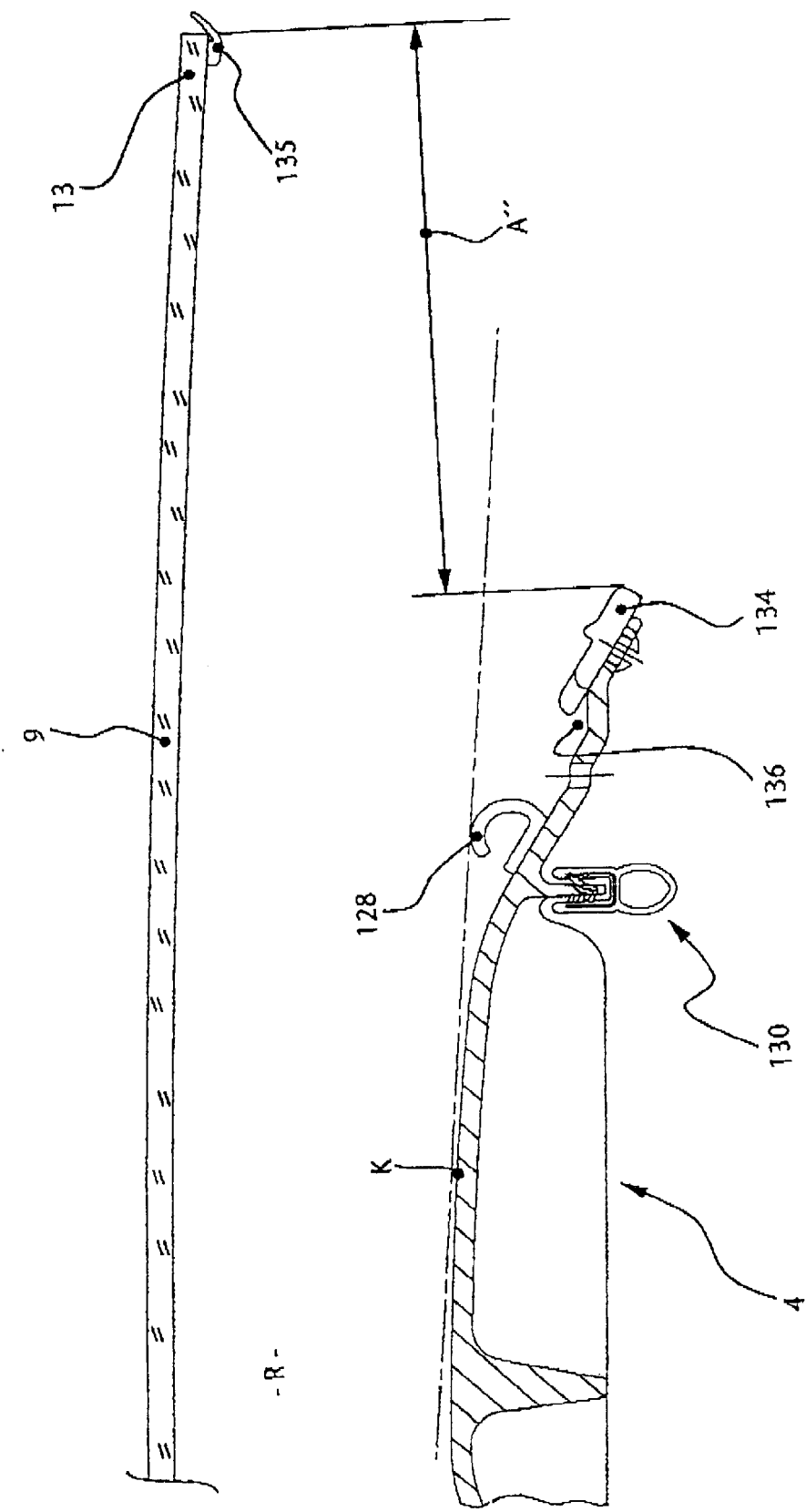

FIG. 7 shows a representation similar to that of FIG. 6 with the rear window and the folding top clamping collar in a spaced-apart position, FIG. 8 shows a representation of a detail similar to that of FIG. 6 with the rear components in the open position of the folding top of FIG. 5, FIG. 9 shows an enlarged sectional representation, of the folding top similar to that of FIG. 1, with the control assembly between the folding top clamping collar and the rear window in a second embodiment, FIG. 10 shows the folding top frame of FIG. 9 in an opening phase with the movement curve of the components, FIG. 11 shows an enlarged sectional representation of the rear window, supported at the folding top clamping collar, in the region of a unit, which guides the pushing and is provided at the control assembly, FIG. 12 shows a cross sectional representation of the unit guiding the pushing of FIG. 11, FIG. 13 shows an enlarged representation of a detail of the components of the unit guiding the pushing of FIG. 11, FIG. 14 shows a representation of the unit guiding the pushing along the line XII—XII in FIG. 12, FIG. 15 shows an enlarged side view of a third embodiment of the folding top frame in the closed position, similar to that of FIG. 1, FIGS. 16–18 show representation of different movement phases during the shifting of the folding top frame of FIG. 15 into the open position, FIG. 19 shows a perspective rear view of the folding top frame in a fourth embodiment, similar to that of FIG. 15, FIG. 20 shows a perspective rear view of the folding top frame of FIG. 19 in a movement phase, FIG. 21 shows an enlarged sectional representation of the rear window in a median longitudinal plane in FIG. 1, and FIG. 22 shows a sectional representation, similar to that of FIG. 21, with the rear window in a position at a distance from the folding top clamping collar.

DESCRIPTION OF THE PREFERRED EMBODIMENTS

FIG. 1 shows a convertible vehicle, which is labeled 1 as a whole and the folding top frame 3 (FIG. 2) constructed in mirror image fashion to the longitudinal median plane 2 of the vehicle and which has a rear folding top clamping collar 4. When shifted about a main bearing, which is generally labeled 5 and attached to the car body, the folding top 7, which has a flexible roof skin 6, can be shifted into the open position, shown in FIG. 5, and can be returned from the open position into the closed position. In the open position, the folded back folding roof 7 together with the folding top frame 3, can be stowed in a folding top compartment 8 (FIG. 2), the details of which are not shown. In the rear region of its flexible roof skin 6, the folding top 7 is provided with a rear window 9 which has an essentially rectangular peripheral contour and extends above the folding top clamping collar 4 and, in particular, is constructed as a solid glass pane.

For the convertible vehicle 1, which is constructed pursuant to the invention, the rear window 9 is supported in the region of its lower transverse side edge 13 directly on the folding top clamping collar and has a frame 15 which is connected with the roof skin 6 in the region of the upper transverse side edge 10 and in the region of the two longitudinal side edges 11, 12 (FIG. 1), and to which a control assembly 14 is linked, with which the frame 15 and the rear window 9 can be shifted jointly (FIGS. 2–5).

Referring to FIG. 2 with the enlarged representations of the details of FIGS. 6–8 makes the supportive connection of the rear window 9 at the folding top clamping collar 4 with the control assembly 14 clear. In a first embodiment, the control assembly has a hinged strut 16 which extends in the vicinity of the main bearing 5 between a side part 17 of the frame 15 and the folding top clamping collar 4 and, on the other hand, acts together with a unit 18 which guides the pushing and connects the frame 15 with the folding top clamping collar 4.

The hinged strut 16 is provided with two legs 20 and 21 which are connected in the region of the joint 19 by a connecting lever 22 (FIG. 2) with the folding top frame 3 (main guiding rod H, FIG. 4) and with the main bearing 5. An additional support of the rear components is achieved with this connecting lever 22. The stowing movement of the rear window 9 (FIGS. 3–5) and the shifting of the transverse side edge 13 relative to the folding top clamping collar 4, which takes place at the same time (distance S, FIG. 3), is controlled essentially by the shifting of the roof skin 6, a positive control being attained at the same time with the connecting lever 22.

In a first movement phase (arrow B, FIG. 3), the rear component is shifted into an almost vertical intermediate position because a driving mechanism (not shown) which is provided at the main bearing 5 and/or a hydraulic cylinder 23, used as a folding top driving mechanism, initiate this swiveling motion. During this motion, the rear window 9 is lifted from a sealing part D (FIG. 12) provided on the folding top clamping collar 4 and shifted relative to the closed position by the distance A.

During the continuation of the opening process (FIG. 4, FIG. 5), the entire folding top frame 3 (arrow E) is moved by means of the cylinder 23 (arrow Z) and now shifted with a lowering motion B' in the direction of the folding top compartment 8, the rear window 9 being shifted back in the direction of the folding top clamping collar 4 (distance A', FIG. 4) and, after that, a pushing motion (arrow F) being initiated on the rear window 9 such that, in the stowed position of FIG. 5, the rear window 9 protrudes towards the rear by a distance A" beyond the stowed folding top clamping collar 4.

In FIGS. 6–8, the unit 18 guiding the pushing can be seen in an enlarged sectional representation. The unit 18 has a profiled steering body 24 fixed at the frame 15 in the region of the side part 17 and at the arc-shaped curved guiding rail 25 of which a holding claw 27, hinged to the folding top clamping collar 4, engages. The holding claw 27 is supported at a bracket L by a joint 26 (FIG. 13). In an advantageous embodiment, the components of the unit 18 guiding the pushing consist of a plastic in the region of the parts 25 and 27 which are in sliding contact with one another.

In FIGS. 11–14, the connection of the profiled steering body 24 is shown in sectional representations. It becomes clear that the holding claw 27 grips behind a guiding rail 25 having a T-shaped profile and an undercut guiding groove 29 and, in the region of the joint 26, a supporting axle 28 connects the holding claw 27 pivotably with the bracket L.

With this structurally simple construction, the sliding connection of the parts is brought about so that the displacement of the rear window 9, shown by the arrow R or R' in FIGS. 7 and 8, can be influenced by the unit 18, guiding the pushing during the opening process (FIGS. 3–5) or during the closing process (in the opposite course of motions). The swiveling motion in the region of the hinged strut 16 takes place during the movement of the components in a swiveling direction T (FIG. 7) so that the guiding rail 25, sliding in the complementary holding claw 27, is shifted correspondingly synchronously (FIG. 8) and the rear window 9 reaches the stowed position by a swiveling and pushing motion (arrow R').

In FIGS. 9 and 10, the control assembly 14' is shown in a second embodiment and has a tensioning assembly 31 which extends between the front hinged strut 16' and the rear unit 18, guiding the pushing. This tensioning assembly 31 is constructed in the form of an adjustable compression spring 32 which is held in the region of the respective bearings 35 and 36 between a protecting leg 33 at the hinged strut 16' and a supporting part 34 at the folding top clamping collar 4.

This control assembly 14' can be adjusted with the tensioning assembly 31 with respect to the motion of the parts in the rear region of the vehicle such that an optimum folding of the roof skin 6 takes place during the opening and closing motions (FIG. 10). As already described by means of the embodiment of the assembly 14, the respective swiveling position of the rear window 9 in the vicinity of the hinged strut 16 (FIG. 3) or 16' (FIG. 9) and of the unit 18, which acts together with the hinged strut and guides the pushing, is guided by the folding and tensioning motion of the roof skin 6. During this folding or tensioning motion, appropriate tensile forces are exerted on the roof skin 6 in the region of the previously described components, especially by the swiveling motion T of the hinged strut 16 or 16'.

In order to transfer the therefrom resulting folding top stresses optimally to the edge connection of the rear window 9 in the region of the frame 15, the compression spring 32 has a spring force P which counteracts the swiveling motion T of the hinged struts 16 and 16' during the displacement of the roof skin 6. In this manner, a tight pre-adjustment of the roof skin tension is achieved, as a result of which, during the opening process (FIG. 2) an intended movement and folding of the roof skin 6 takes place only when the spring force P, set at the compression spring 32, is exceeded. Accordingly, overloading of the folding top material in the rear region 6' (FIG. 9) is avoided and, with the folding top 7 closed, the rear region 6' of the roof skin is also stiffened so that it has a smooth and optically pleasing contour.

Instead of the above-described compression spring 32, a torsion spring (not shown), with which the above-described tension effect can be achieved and which engages the bearings 40 and/or 41 of the hinged strut 16', can also be provided.

For optimally connecting the roof skin 6 to the frame 15 of the rear window 9, a pocket 37 (FIG. 9) of the material of the folding top, which extends to the folding top clamping collar 4 and is provided as a stress equalization zone in the roof skin 6, is additionally integrated in the system in this region. In FIG. 10, the displacement of the folding top 7, similar to that of FIG. 4, is shown by a curve x, a water drainage gutter 38 or a similar component at the rear, forming an edge 39 of the car body, illustrating the tight space relationships. Especially in the case of these installation and swiveling conditions, a collision-free displacement of the folding-top frame 3 is made possible with the control assembly 14, 14' in the region of connection of the rear window.

The enlarged sectional representations of FIGS. 15–19 illustrate, in a third embodiment, the action of the control assembly 14, the control assembly being provided with a parallelogram linkage arrangement having two hinged struts 116 and 117. These two hinged struts 116 and 117 engage the rear window 9 directly (not shown) or are hinged to the respective hinge points 118 and 119 at the frame 15 of the rear window 9. In the region of the hinge points 120 and 121, the hinged struts 116 and 117 are connected to the folding top clamping collar 4.

Figure 16:
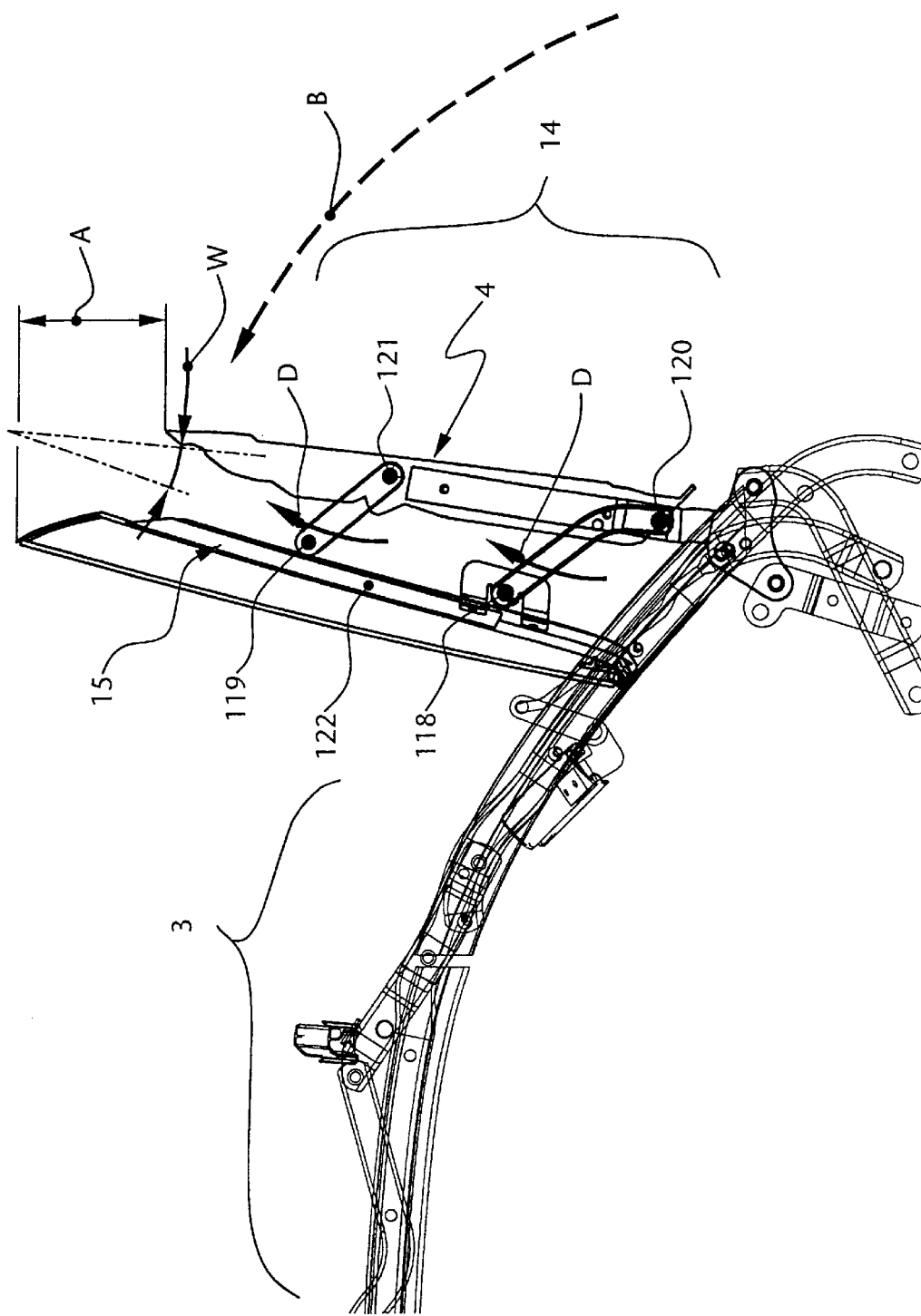

In the closed position, the lower transverse side edge 13 of the rear window 9 is fixed on the folding top clamping collar 4 in a detachable connecting engagement (FIG. 15) such that, when and the opening motion is initiated (arrow B; FIG. 16) the rear window 9 is swivelled up together with the folding top clamping collar 4. At the same time, the rear window 9 can be lifted into a propped position (FIG. 16) from the folding top clamping collar 4 and form an angle W. In this phase B of the movement, the lower transverse side edge 15 of the rear window 9, starting out from its supported position on the folding top clamping collar 4, is shifted relative to the folding top clamping collar 4 towards the outside so that the two parts are at a distance A from one another. The two side struts 116 and 117 synchronously carry out a swiveling motion which is directed counter to the opening motion B.

During this opening motion (arrow B), the two hinged struts 116 and 117 (FIG. 15) of the parallelogram linkage, which forms a positive control, are directed forwards essentially parallel to one another, are guided into their respective swiveling position (FIGS. 16, 17, 18) directly by the folding and tensioning motion of the roof skin 6. A driving element is therefore not provided for this control assembly in the embodiment shown. However, it is conceivable that such a driving mechanism is coupled to one of the components (not shown) and as such, active support of the swiveling motion D is achieved in the region of the struts 116 and 117.

The hinged struts 116 and 117 are coupled to the respective side legs 122 and 123 (not visible) of the frame 15. In the embodiment of FIGS. 19 and 20, the hinged strut 116' is provided with an additional joint part 124 which has the swiveling axis S so that the part 125 of the hinged strut 116', which is directed towards the rear window 9, after swiveling about the axis S in the transverse direction of the vehicle, grips below the parts of the folding top frame 3 (FIG. 18) which has been shifted into the stowed position.

Figure 17:
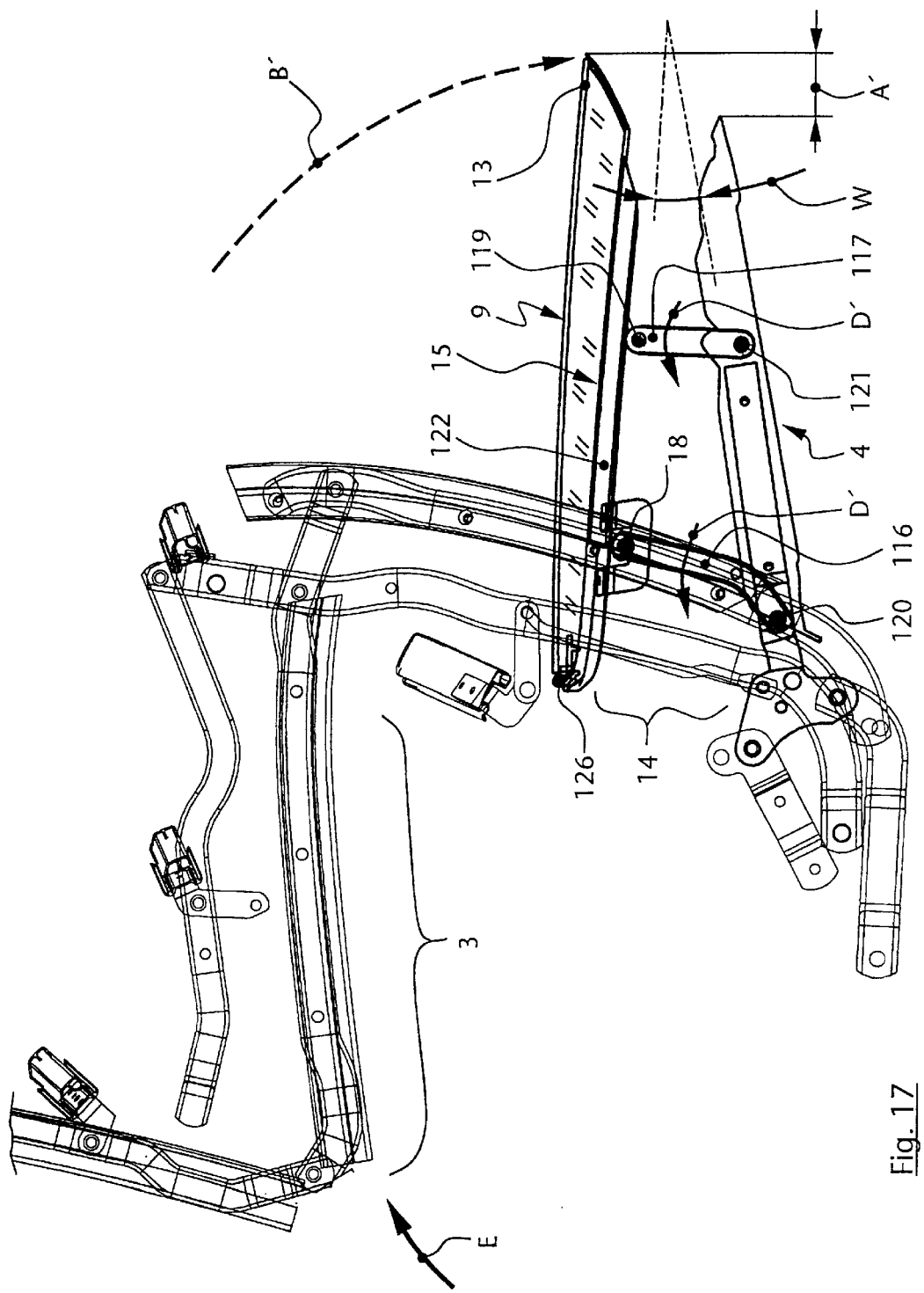
Figure 18:
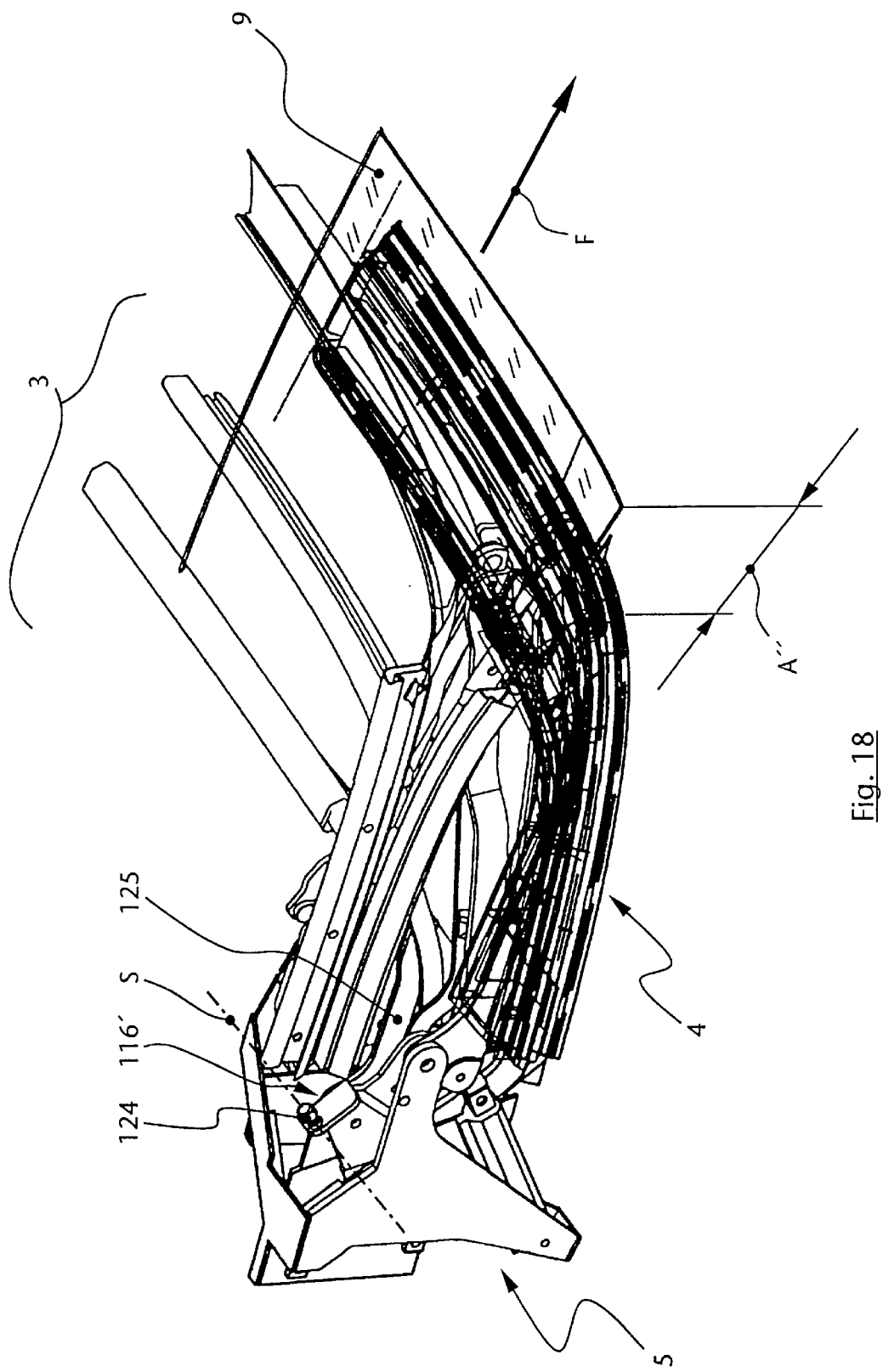

In FIG. 17, a second phase during the displacement of the folding top to 3 into the open position (FIG. 18) is shown, the front part of the folding top frame being shifted by a driving mechanism, which is not shown, towards the rear in an opening direction E and, jointly with the assembly in the rear region of the vehicle, carrying out a synchronous downwards movement B' to the folding top compartment 8. At the same time, the hinged struts 116 and 117 carry out a swiveling motion D' so that the rear window 9 is shifted back to the folding top clamping collar 4 and, at the same time, a distance A' is formed. With this controlled movement of the rear window 9, the path of movement of the components is optimized so that movement in a narrow space is possible and the folding top 7 can be moved as a whole even past protruding parts of the car body. In the stowed position (FIG. 18), the components have an advantageously tight stowed position and the rear window 9, shifted in this position in the direction of arrow F, protrudes by a distance A" beyond the stowed folding top clamping collar 4.

In FIG. 20, the frame 15, which is provided for tying down the folding roof 7, is shown in a sectional representation with its connection to the roof skin 6. The roof skin 6 overlaps the side legs 122 and 123 of the frame 15 as well as an upper transverse leg 126. In the region connecting the side leg 122 and the folding top clamping collar 4, the roof skin 6 is provided with a material pocket 127, which is shown diagrammatically by two broken lines, so that in this region of the roof skin 6, a corresponding reserve of material is present and a tension-free shifting of the rear window 9, as well as an optimum motion of the rear window 9 is possible because of the above-described structural parts.

In FIGS. 21 and 22, the region connecting the rear window 9 and the folding top clamping collar 4 is shown in an enlarged sectional representation of the longitudinal median plane 2 of the vehicle in FIG. 1. It is clear that the lower transverse side edge 15 of the rear window 9, in an advantageous embodiment, rests on a seal 128 (FIG. 21) which is provided at the folding top clamping collar 4. Likewise, it is conceivable that the rear window 9 rests on several seals which are provided at the folding top clamping collar 4, or that the rear window 9, in the region of the transverse side edge 13, is extended up to a folding top compartment lid 129 and that by means of a seal, a direct support and sealing to the inner space R of the vehicle 1 is formed (not shown).

In the case of the sealing system shown for the supported rear window 9, a car body seal 130 resting on the folding top compartment lid 129 is provided at the folding top clamping collar 4 opposite to the window seal 128. In an advantageous embodiment, the folding top compartment lid 129 is provided in the region overlapping the collar 4 with a supporting plate 131 which acts as a thrust bearing and, in turn, has seals 132 and 133.

In the region of the rear window support towards the folding top clamping collar 4, an antidazzle device 134, which is also optically effective, is supported at the folding top clamping collar 4 as a lower edge termination. At the upper edge region of the antidazzle device 134, a sealing lip 135, which can be fixed to the underside of the rear window 9, can be placed such that tolerance compensation is attained in this region, the mutually adjoining parts have an optically pleasing connecting zone and, at the same time, a covered water-conducting gutter 136 is formed.

With a line of dots and dashes, a plane G above the folding top clamping collar 4 is shown, up to the region of which a vehicle user has an unobstructed view, which is achieved because the rear window 9 which is held in the frame 15 is supported in the region of its lower transverse side edge 13 directly on the folding top clamping collar 4 or on the seal 28. In FIG. 22, the components described above are illustrated in a position in which they are spaced apart and which illustrates essentially the distance A" in the stowed position of the folding top 4, shown in FIG. 18.

What is claimed is:

1. A convertible vehicle with a folding top frame, which is constructed in mirror-image fashion to the longitudinal median plane of the vehicle, a folding top having a rear folding top clamping collar and, when shifted about a main bearing fastened to the car body, can be stowed in a rear folding top compartment or returned from this, a flexible roof skin, and a rear window which extends above the folding top clamping collar and has an essentially rectangular peripheral contour, and the rear window, detachable in the region of the lower transverse side edge from the folding top clamping collar having at least in the region of its two longitudinal side edges a frame which takes hold of the flexible roof skin, wherein the rear window is supported in the closed position with its lower transverse side edge directly from above on the folding top clamping collar, and a control assembly is linked to the frame encompassing the rear window in a U-shaped fashion such that the frame with the rear window is liftable from the folding top clamping collar at least phasewise during any movement of the folding top and shiftable relative to the folding top clamping collar at a distance and an angle.

2. The convertible vehicle of claim 1, wherein the rear window is liftable from the folding top clamping collar and shiftable relatively to the closed position.

3. The convertible vehicle of claims 1 or 2, wherein the lower transverse side edge of the rear window, starting out from its detachable, supported position on the folding top clamping collar, is shiftable relative to the folding top clamping collar towards the outside.

4. The convertible vehicle of claims 1 or 2, wherein the lower transverse side edge of the rear window, in the region of at least one of the folding top clamping collar and a folding top compartment lid is fixable in a detachable connecting engagement from above on at least one sealing part.

5. The convertible vehicle of claims 1 or 2, wherein the control assembly has a hinged strut which extends in the vicinity of the main bearing between the respective side part of the frame and the folding top clamping collar and acts together with a guide unit which guides a rearward pushing motion of the rear window and connects the frame with the folding top clamping collar.

6. The convertible vehicle of claim 5, wherein the hinged strut is connected by a connecting lever linked eccentrically with the hinged strut to at least one of the folding top frame and the main bearing.

7. The convertible vehicle of claim 5, wherein the guide unit has a profiled steering body affixed at the side part of the frame and including an arc-shaped, curved guiding rail engageable with a holding claw pivotably hinged to the folding top clamping collar.

8. The convertible vehicle of claim 7, wherein the holding claw forms a sliding connection at the guiding rail.

9. The convertible vehicle of claim 7, wherein the holding claw, held by a bracket on the folding top clamping collar, has a holding groove, which grips the guiding rail, which has a T-shaped profile, from below.

10. The convertible vehicle of one of claims 1 or 2, wherein the control assembly has a clamping assembly which extends between a front hinged strut and a guide unit guiding a rearward pushing motion of the rear window.

11. The convertible vehicle of claim 10, wherein the clamping assembly is provided with at least one of an adjustable compression spring and a torsion spring.

12. The convertible vehicle of one of claims 1 or 2, wherein, as control assembly for the rear window, a parallelogram linkage with two hinged struts, which are supported in hinge points and extend between the folding top clamping collar and the frame of the rear window, is provided.

13. The convertible vehicle of claim 12, wherein the two hinged struts of the parallelogram linkage are directed essentially parallel to one another towards the front in the closed position.

14. The convertible vehicle of claim 12, wherein the two hinged struts are hinged to a side leg of the frame.

15. The convertible vehicle of claim 12, wherein the frame, which is provided for connecting the folding top, includes side legs and an upper transverse leg and is integrated into the roof skin which overlaps the side legs and the upper transverse leg.

16. The convertible vehicle of claim 12, wherein the respective swiveling position of the rear window is guided in a region of at least one of the hinged struts and a guide unit for guiding a rearward pushing motion of the rear window, by the folding or tensioning movement of the roof skin.

17. The convertible vehicle of claim 15, wherein the rear window, on the outside in the region of the side leg has a pocket of folding top material which extends to the folding top clamping collar.

18. The convertible vehicle of claims 1 or 2, wherein the lower transverse side edge (13) of the rear window (9) is provided with a sealing lip (125), which protrudes beyond the rear window (9) and equalizes tolerances and acts as a water gutter.

19. The convertible vehicle of claims 1 or 2, wherein the rear window, in the region of the transverse side edge, acts together with an antidazzle device provided at the folding top clamping collar.

20. A convertible vehicle, comprising:

a folding top including a folding top frame having a rear folding top clamping collar and a flexible roof skin retained by said folding top frame, said folding top having an open position in which said folding top is adapted to be stored in a storage compartment in the vehicle and a closed position;

said folding top further including a rear window arranged in said folding top frame above said folding top clamping collar, said rear window having a lower edge supportable directly on said folding top clamping collar when said folding top is in the closed position and being detachable from said folding top clamping collar in a region of said lower edge;

a main bearing, said folding top being rotatable about said main bearing into and out of the storage compartment;

a window frame for supporting said rear window, said window frame being arranged to hold a portion of said roof skin; and a control assembly linked to said window frame for enabling said window frame and said rear window to be jointly lifted apart from said folding top clamping collar during movement of said folding top and shifted relative to said folding top clamping collar.

21. The convertible vehicle of claim 20, wherein said folding top frame is constructed in mirror image fashion to a longitudinal median plane of the vehicle.

22. The convertible vehicle of claim 20, wherein said rear window has a substantially rectangular shape.

23. The convertible vehicle of claim 20, wherein said window frame is arranged to support said rear window at least in a region of two longitudinal side edges of said rear window.

24. The convertible vehicle of claim 20, wherein said window frame is arranged to support said rear window in a region of two longitudinal side edges and an upper edge of said rear window such that said window frame is U-shaped.

25. The convertible vehicle of claim 20, wherein said rear window is arranged to be liftable from said folding top clamping collar and shifted relative to said folding top clamping collar when said folding top is in the closed position.

26. The convertible vehicle of claim 20, wherein said lower edge of said rear window is rotatable outward upon lifting of said rear window apart from said folding top clamping collar.

27. The convertible vehicle of claim 20, further comprising at least one sealing part, said lower edge of said rear window being removably engaged to said at least one scaling part.

28. The convertible vehicle of claim 20, wherein said window frame has a side part for supporting each side of said rear window, said control assembly including a hinged strut arranged proximate said main bearing between a respective one of said side parts and said folding top clamping collar, the convertible vehicle further comprising a guide unit for guiding movement of said folding top frame and connecting said window frame with said folding top clamping collar.

29. The convertible vehicle of claim 28, wherein said control assembly further comprises a connecting lever for connecting said hinged strut to at least one of said folding top frame and said main bearing, said connecting lever being linked eccentrically to said hinged strut.

30. The convertible vehicle of claim 28, wherein said guide unit has a profiled steering body attached to said respective side part and an arcuate guiding rail, the convertible vehicle further comprising a holding claw pivotally hinged to said folding top clamping collar and engaging said arcuate guiding rail.

31. The convertible vehicle of claim 30, wherein said holding claw forms a sliding connection at said arcuate guiding rail.

32. The convertible vehicle of claim 30, further comprising a bracket for holding said holding claw on said folding top clamping collar, said holding claw including a holding groove arranged to grip said guiding rail and having a T-shaped profile.

33. The convertible vehicle of claim 28, wherein said control assembly further includes a clamping assembly arranged to extend between said hinged strut and said guide unit, said guide unit being arranged rearward in the vehicle from said hinged strut.

34. The convertible vehicle of claim 33, wherein said clamping assembly includes at least one of an adjustable compression spring and a torsion spring for tensioning said control assembly.

35. The convertible vehicle of claim 20, wherein said control assembly comprises two hinged struts each pivotally connected at one end to said rear window and at an opposite end to said folding atop clamping collar to thereby define a parallelogram linkage.

36. The convertible vehicle of claim 35, wherein said two hinged struts are substantially parallel to one another when said rear window is in a closed position.

37. The convertible vehicle of claim 35, wherein said window frame includes a side leg, said two hinged struts being hinged to said side leg.

38. The convertible vehicle of claim 35, wherein said window frame includes longitudinal side parts or side legs and an upper transverse leg and said window frame is integrated into said roof skin such that said roof skin overlaps said longitudinal side legs and said upper transverse leg of said window frame.

39. The convertible vehicle of claim 20, wherein the movement of said rear window is guided by a folding or tensioning movement of said roof skin.

40. The convertible vehicle of claim 20, wherein said rear window includes a pocket of material on an outside in a region of a longitudinal side part or a side leg, said pocket of material extending to said folding top clamping collar.

41. The convertible vehicle of claim 20, further comprising a sealing lip on said lower transverse edge of said rear window, said sealing lip protruding beyond said rear window and being adapted to equalize tolerances and act as a water gutter.

42. The convertible vehicle of claim 20, further comprising an antidazzle device arranged on said folding top clamping collar proximate said lower edge of said rear window.

* * * * *